US009056601B2

(12) United States Patent
Ogiwara et al.

(10) Patent No.: US 9,056,601 B2
(45) Date of Patent: Jun. 16, 2015

(54) BRAKE APPARATUS (71) Applicant: HITACHI AUTOMOTIVE SYSTEMS, LTD., Ibaraki (JP)

(72) Inventors: Takato Ogiwara, Yamanashi (JP); Mitsuhiro Endo, Yamanashi (JP); Naganori Koshimizu, Yamanashi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 187 days.

(21) Appl. No.: 13/836,210

(22) Filed: Mar. 15, 2013

(65) Prior Publication Data
US 2013/0257140 A1 Oct. 3, 2013

(30) Foreign Application Priority Data

Mar. 30, 2012 (JP) ................................. 2012-081445

(51) Int. Cl.
| B60T 8/64 | (2006.01) |
| B60T 13/58 | (2006.01) |
| B60T 13/16 | (2006.01) |
| B60T 1/10 | (2006.01) |
| B60T 7/22 | (2006.01) |
| B60T 8/44 | (2006.01) |
| B60T 8/48 | (2006.01) |
| B60T 11/20 | (2006.01) |
| B60T 13/52 | (2006.01) |

(52) U.S. Cl.
CPC ............. *B60T 13/586* (2013.01); *B60T 13/161* (2013.01); *B60T 1/10* (2013.01); *B60T 7/22* (2013.01); *B60T 8/442* (2013.01); *B60T 8/4872* (2013.01); *B60T 11/20* (2013.01); *B60T 13/52* (2013.01)

(58) Field of Classification Search
USPC ........... 303/150, 3, 20, 151, 113.1, 15, 119.1, 303/115.2, 116.1, 116.2
See application file for complete search history.

(56) References Cited

U.S. PATENT DOCUMENTS

| 5,433,512 A * | 7/1995 | Aoki et al. ........................ 303/3 |
| 5,853,229 A * | 12/1998 | Willmann et al. ................ 303/3 |
| 2005/0269875 A1 | 12/2005 | Maki et al. |

FOREIGN PATENT DOCUMENTS

JP 2006-96218 4/2006

* cited by examiner

*Primary Examiner* — Melanie Torres Williams
(74) *Attorney, Agent, or Firm* — Wenderoth, Lind & Ponack, L.L.P.

(57) ABSTRACT

A controller controls a hydraulic control device to generate a target braking force corresponding to the stroke of a brake pedal by adjusting a controlled hydraulic braking force portion generated by the hydraulic control device on the basis of the relationship with a master hydraulic braking force portion generated from the brake hydraulic pressure in a master cylinder and a regenerative braking force portion generated by a regenerative brake device. The regenerative brake device maximizes the regenerative braking force portion before the stroke of the brake pedal reaches an idle stroke, and thereafter, the hydraulic control device 5 starts braking by the controlled hydraulic braking force portion. When the stroke of the brake pedal reaches the idle stroke, the master cylinder starts braking by the master hydraulic braking force portion.

20 Claims, 8 Drawing Sheets

BRAKE APPARATUS

BACKGROUND OF THE INVENTION

The present invention relates to a brake apparatus for use in a vehicle equipped with an electric motor for running. The brake apparatus performs regenerative cooperative control to obtain a desired braking force by controlling the braking force distribution between friction braking force generated by a hydraulic brake and regenerative braking force generated by a dynamo.

Regenerative cooperative control is a known technique used in brake apparatus for vehicles to obtain a desired braking force by controlling the braking force distribution between friction braking force generated by a hydraulic brake and regenerative braking force generated by a dynamo, e.g. a motor generator. The hydraulic brake activates a disk brake or the like provided for each wheel by using a brake hydraulic pressure generated by a master cylinder, a hydraulic pump, or the like. Japanese Patent Application Publication No. 2006-96218 discloses a brake control apparatus having a hydraulic control device interposed between a master cylinder and a hydraulic brake for each wheel. The hydraulic control device has a pump, an accumulator, electromagnetic valves, and so forth to selectively increase, reduce or maintain a hydraulic pressure to be supplied to the hydraulic brake. During regenerative braking, the hydraulic control device adjusts the hydraulic pressure to be supplied to the hydraulic brake, thereby performing regenerative cooperative control.

SUMMARY OF INVENTION

The brake control apparatus disclosed in Japanese Patent Application Publication No. 2006-96218, however, has the following problem. As the vehicle speed reduces in response to an operation of the brake pedal, the regenerative braking force weakens; therefore, a brake hydraulic pressure is generated by the hydraulic control device to assist the braking force. If, at this time, the generation of a brake hydraulic pressure by the master cylinder has already been started, a change in the hydraulic pressure in the master cylinder caused by the operation of the hydraulic control device is transmitted to the brake pedal, which degrades the brake pedal operation feeling.

An object of the present invention is to suppress the degradation of the brake pedal operation feeling in a brake apparatus performing regenerative cooperative control.

The present invention provides a brake apparatus having a regenerative brake device applying a regenerative braking force to a wheel of a vehicle by generating electric power from rotation of the wheel according to a depressed position of a brake pedal, a hydraulic pressure generating device supplying a hydraulic fluid to a wheel cylinder when the brake pedal is depressed to at least a predetermined brake pedal position, and a pump mechanism delivering the hydraulic fluid from the hydraulic pressure generating device to the wheel cylinder by a pump. The pump mechanism has already supplied the hydraulic fluid to the wheel cylinder when the brake pedal is depressed beyond a maximum regenerative braking pedal depressed position at which the regenerative brake device generates a maximum regenerative braking force. The predetermined brake pedal position is where the brake pedal is depressed beyond the maximum regenerative braking pedal depressed position.

In addition, the present invention provides a brake apparatus having a hydraulic pressure generating device supplying a hydraulic fluid to a wheel cylinder provided in association with a wheel when a brake pedal is operated by at least a predetermined brake pedal operation quantity, a pump mechanism sucking and supplying the hydraulic fluid from the hydraulic pressure generating device to the wheel cylinder, and a control unit controlling the supply of the hydraulic fluid to the wheel cylinder by the pump mechanism, the control unit being connected to a regenerative brake device applying a regenerative braking force to the wheel by generating electric power from rotation of the wheel. The control unit controls the pump mechanism to supply the hydraulic fluid to the wheel cylinder when the brake pedal is operated in excess of a maximum regenerative braking pedal operation quantity at which the regenerative brake device generates a maximum regenerative braking force. The predetermined brake pedal operation quantity is larger than the maximum regenerative braking pedal operation quantity.

According to the present invention, it is possible to suppress the degradation of the brake pedal operation feeling in the brake apparatus performing regenerative cooperative control.

DESCRIPTION OF EMBODIMENTS

Embodiments of the present invention will be explained below in detail with reference to the accompanying drawings. An automotive brake apparatus 200 according to a first embodiment of the present invention will be explained with reference to FIG. 1. The brake apparatus 200 has a booster 101 activated by an operation of a brake pedal 19, a master cylinder 110 attached to the booster 101, a hydraulic control device 5, which is a pump mechanism connected to hydraulic pressure ports 164 and 165 of the master cylinder 110 to supply a hydraulic fluid (brake fluid) to wheel cylinders Ba to Bd provided in association with wheels Wa to Wd, a regenerative brake device 8 having a dynamo connectable to a driven wheel to perform regenerative braking, and a controller 7, which is a control unit connected to the regenerative brake device 8 and controlling the hydraulic control device 5. In this embodiment, the booster 101 and the master cylinder 110 constitute a hydraulic pressure generating device supplying the hydraulic fluid to the wheel cylinders when the brake pedal is depressed to at least a predetermined brake pedal position.

Figure 1:
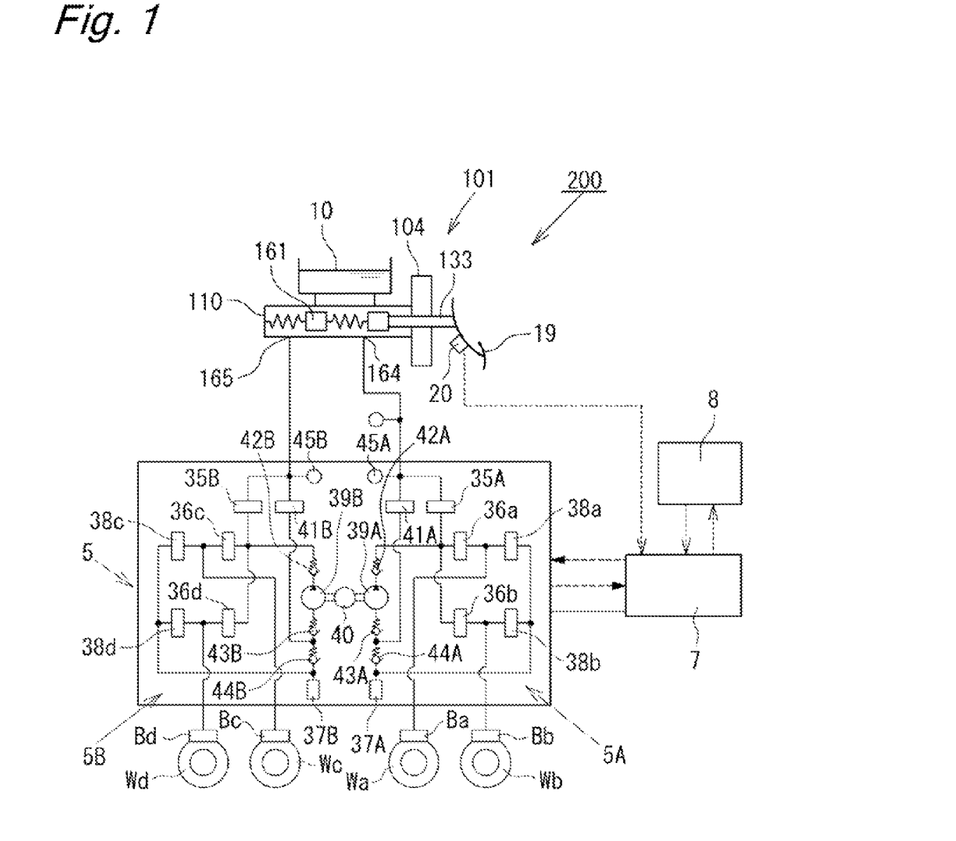
FIG. 1 is a circuit diagram schematically showing the structure of a brake apparatus according to a first embodiment of the present invention.

The brake apparatus 200 has hydraulic circuits of two systems arranged in the form of "X-piping" between the master cylinder 110 and the hydraulic control device 5. The hydraulic circuits include a first hydraulic circuit 5A (the right side of the center of the hydraulic control device 5 as seen in FIG. 1) for supplying the hydraulic fluid from the primary port 164 of the master cylinder 110 to the wheel cylinders Ba and Bb for the left front wheel Wa and the right rear wheel Wb, and a second hydraulic circuit 5B (the left side of the center of the hydraulic control device 5 as seen in FIG. 1) for supplying the hydraulic fluid from the secondary port 165 of the master cylinder 110 to the wheel cylinders Bc and Bd for the right front wheel We and the left rear wheel Wd.

In this embodiment, the wheel cylinders Ba to Bd are those of hydraulic disk brakes in which pistons are advanced by the supply of a hydraulic pressure to press brake pads against disk rotors rotating together with the associated wheels, thereby generating braking force. The brakes, however, may be other types of hydraulic brakes, e.g. publicly known drum brakes.

The first hydraulic circuit 5A and the second hydraulic circuit 5B are similar in structure to each other. The hydraulic circuits connected to the wheel cylinders Ba to Bd of the wheels Wa to Wd are also similar in structure to each other. In the following description, the suffixes A and B and a to d added to the reference marks indicate that the constituent elements denoted by these reference marks are associated with the first and second hydraulic circuits 5A and 5B and the wheels Wa to Wd, respectively.

The hydraulic control device 5 has supply valves 35A and 35B which are electromagnetic on-off valves controlling the supply of hydraulic pressure from the master cylinder 110 to the wheel cylinders Ba to Bd of the wheels Wa to Wd, pressure increasing valves 36a to 36d which are electromagnetic on-off valves controlling the supply of hydraulic pressure to the wheel cylinders Ba to Bd, system reservoirs 37A and 37B for temporarily storing the hydraulic fluid released from the wheel cylinders Ba to Bd, pressure reducing valves 38a to 38d which are electromagnetic on-off valves controlling the supply of hydraulic fluid from the wheel cylinders Ba to Bd to the system reservoirs 37A and 37B, pumps 39A and 39B for supplying the hydraulic fluid to the wheel cylinders Ba to Bd, a pump motor 40 driving the pumps 39A and 39B, boost valves 41A and 41B which are electromagnetic on-off valves controlling the supply of hydraulic fluid from the master cylinder 110 to the suction sides of the pumps 39A and 39B, check valves 42A, 42B, 43A, 43B, 44A and 44B for preventing back-flow from the downstream side toward the upstream side of the pumps 39A and 39B, and hydraulic pressure sensors 45A and 45B provided for the primary port 164 and the secondary port 165, respectively, of the master cylinder 110 to detect hydraulic pressures generated in the master cylinder 110.

The following operating modes can be executed by controlling the operations of the supply valves 35A and 35B, the pressure increasing valves 36a to 36d, the pressure reducing valves 38a to 38d, the boost valves 41A and 41B and the pump motor 40 through the controller 7.

[Normal Braking Mode]

During normal braking, the supply valves 35A and 35B and the pressure increasing valves 36a to 36d are opened, and the pressure reducing valves 38a to 38d and the boost valves 41A and 41B are closed, thereby supplying a hydraulic pressure from the master cylinder 110 to the wheel cylinders Ba to Bd of the wheels Wa to Wd.

[Pressure Reducing Mode]

The pressure reducing valves 38a to 38d are opened, and the supply valves 35A and 35B, the pressure increasing valves 36a to 36d, and the boost valves 41A and 41B are closed, thereby releasing the hydraulic fluid from the wheel cylinders Ba to Bd into the reservoirs 37A and 37B, thereby reducing the hydraulic pressure in the wheel cylinders Ba to Bd.

[Pressure Maintaining Mode]

The pressure increasing valves 36a to 36d and the pressure reducing valves 38a to 38d are closed, thereby maintaining the hydraulic pressure in the wheel cylinders Ba to Bd.

[Pressure Increasing Mode]

The pressure increasing valves 36a to 36d are opened, and the supply valves 35A and 35B, the pressure reducing valves 38a to 38d, and the boost valves 41A and 41B are closed. In this state, the pump motor 40 is operated, thereby returning the brake fluid from the reservoirs 37A and 37B toward the master cylinder 110 to increase the hydraulic pressure in the wheel cylinders Ba to Bd.

[Boosting Mode]

The boost valves 41A and 41B and the pressure increasing valves 36a to 36d are opened, and the pressure reducing valves 38a to 38d and the supply valves 35A and 35B are closed. In this state, the pump motor 40 is operated to activate the pumps 39A and 39B to supply the hydraulic fluid to the wheel cylinders Ba to Bd irrespective of the hydraulic pressure in the master cylinder 110.

Various brake control operations can be performed by appropriately executing the above-described operating modes according to the vehicle conditions. For example, it is possible to execute the following control operations: braking force distribution control to appropriately distribute braking force to each wheel according to the ground load and so forth during braking; anti-lock brake control to prevent locking of wheels by automatically adjusting braking force for each wheel during braking; vehicle stability control to stabilize the behavior of the vehicle through suppression of under steer and over steer by detecting a sideslip of a wheel during running and automatically applying braking force to each wheel appropriately irrespective of the amount of operation of the brake pedal 19; hill start assist control to assist starting of the vehicle on a gradient (up gradient in particular) with the vehicle kept braked; traction control to prevent wheel spin at the time of starting the vehicle, and so forth; vehicle following control to maintain a predetermined distance between the vehicle concerned and a vehicle ahead; lane deviation avoidance control to keep the vehicle in the driving lane; and obstacle avoidance control to avoid collision with an obstacle.

It should be noted that, as the pumps 39A and 39B, publicly known hydraulic pumps may be used, for example, plunger pumps, trochoid pumps, gear pumps, and so forth. Gear pumps are preferably used from the viewpoint of vehicle mountability, silence, pump efficiency, and so forth. The pump motor 40 may be a publicly known motor, for example, a DC motor, a DC brushless motor, or an AC motor. A DC brushless motor is preferably used from the viewpoint of controllability, silence, durability, vehicle mountability, and so forth.

Characteristics of the electromagnetic on-off valves of the hydraulic control device 5 may be appropriately set according to the mode of use. However, the following structure is preferable from the viewpoint of fail-safe and control efficiency. That is, the supply valves 35A and 35B and the pressure increasing valves 36a to 36d are constructed as normally-open valves, and the pressure reducing valves 38a to 38d and the boost valves 41A and 41B are constructed as normally-closed valves. With this structure, when no control signal is available from the controller 7, the required hydraulic pressure can be supplied from the master cylinder 110 to the wheel cylinders Ba to Bd.

The regenerative brake device 8 drives a dynamo (electric motor) by the rotation of at least one wheel during deceleration and braking, thereby recovering kinetic energy as electric power. The regenerative brake device 8 and the controller 7 exchange control signals with each other. During regenerative braking, the controller 7 controls the hydraulic control device 5 to supply the wheel cylinders Ba to Bd with a brake hydraulic pressure calculated by subtracting a regenerative braking force portion from a required braking force based on a signal from a stroke sensor 20 detecting an amount of operation of the brake pedal 19 actuated by the driver, thus performing regenerative cooperative control to obtain a desired braking force.

Next, the booster 101 and the master cylinder 110 will be explained with reference to FIGS. 2 to 5.

Figure 2:
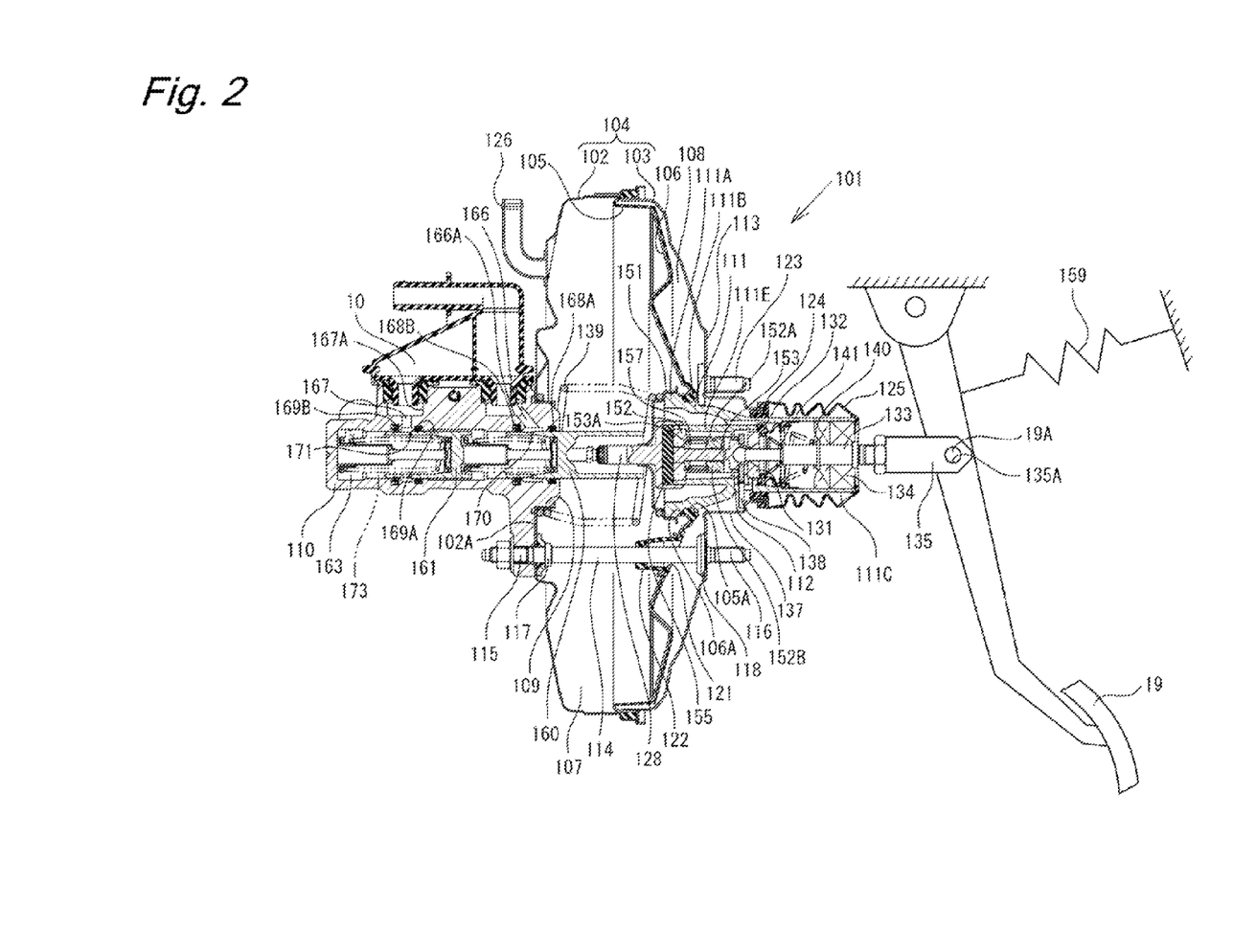
FIG. 2 is a vertical sectional view of a master cylinder and booster of the brake apparatus shown in FIG. 1.
Figure 3:
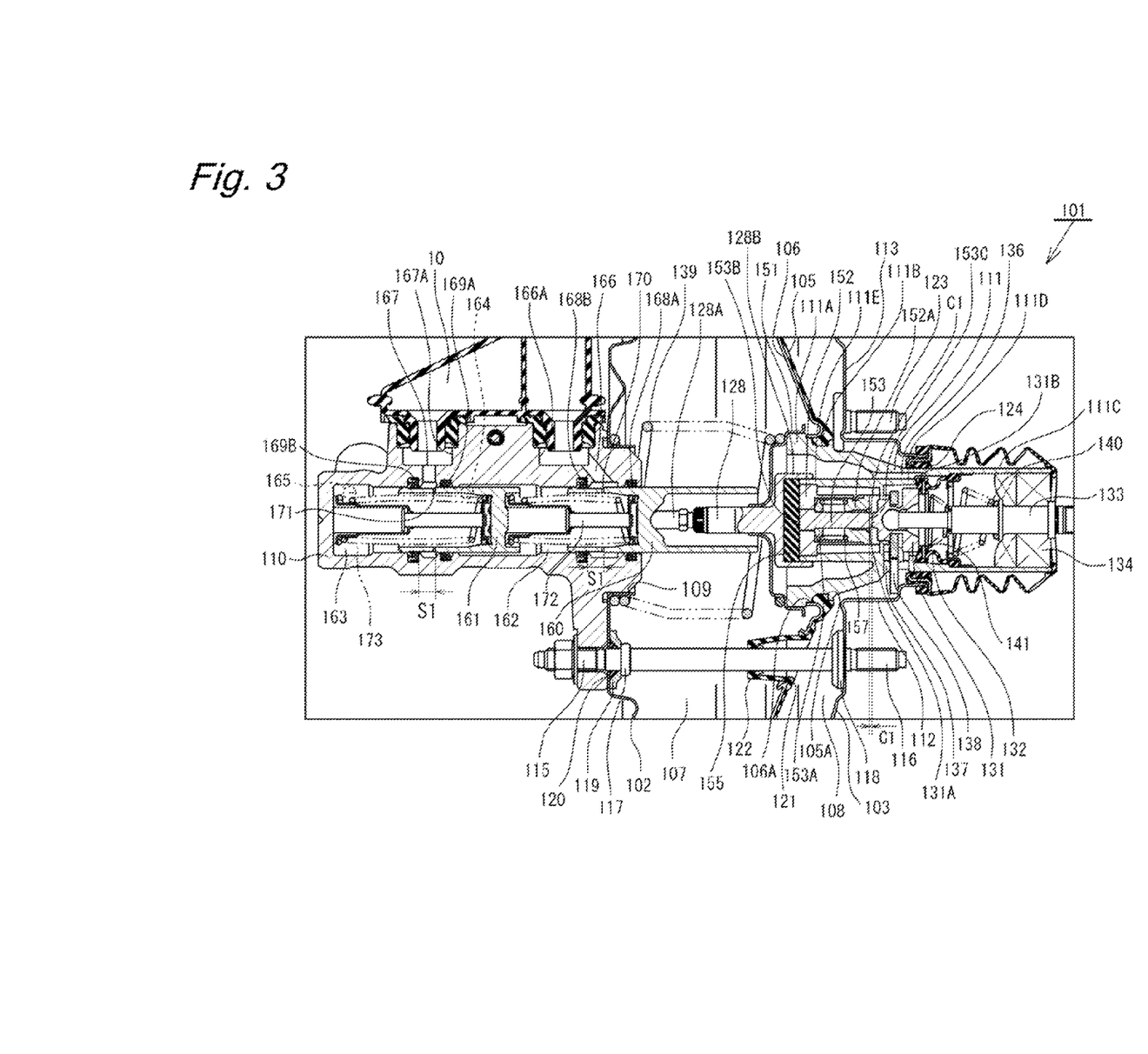
FIG. 3 is an enlarged view of a main part of FIG. 2.

As shown in FIGS. 2 and 3, the booster 101 is a single-type pneumatic booster having a pneumatic actuator as a boost source. The booster 101 has a housing 104 formed by joining together a front shell 102 and a rear shell 103, which are each formed from a thin plate. The interior of the housing 104 is divided into two chambers, i.e. a constant-pressure chamber 107 and a variable-pressure chamber 108, by a power piston 106 having a diaphragm 105. The front shell 102 and the rear shell 103 are each in the shape of a substantially circular cylinder, one end of which is closed. The front and rear shells 102 and 103 are air-tightly joined by fitting the opening edge of the outer periphery of the rear shell 103 into the opening edge of the outer periphery of the front shell 102 and putting an outer peripheral portion of the diaphragm 105 between the opening edges of the front and rear shells 102 and 103.

The master cylinder 110 is secured to the front shell 102. More specifically, the rear end of the master cylinder 110 is inserted into an opening 109 in the center of the bottom of the front shell 102. The front shell 102 has a connecting pipe 126 secured to the outer side thereof. The connecting pipe 126 is connected to a vacuum source (not shown), e.g. an engine intake pipe, to maintain the constant-pressure chamber 107 under a predetermined negative pressure at all times. The rear shell 103 has a circular cylindrical portion 112 projecting from the center of the bottom thereof to allow a valve body 111 (described later) to be inserted thereinto. The rear shell 103 has a securing bearing surface 113 formed around the cylindrical portion 112. The securing bearing surface 113 abuts against a dash panel (not shown) of the vehicle body.

The housing 104 is provided with a tie rod 114 extending therethrough from the front shell 102 to the securing bearing surface 113 of the rear shell 103. The tie rod 114 has a mounting thread portion 115 and a securing thread portion 116 on the opposite ends thereof. The proximal end portions of the mounting and securing thread portions 115 and 116 are enlarged in diameter to form a front flange 117 and a rear flange 118, respectively. The front flange 117 air-tightly abuts against the inner side of a front bearing surface 102A with a retainer 119 and a seal 120 interposed therebetween. The rear flange 118 air-tightly abuts against the inner side of the securing bearing surface 113, and in this state, the rear flange 118 is secured by being caulked toward the rear shell 103. The central portion of the tie rod 114 extends through an opening 121 provided in the power piston 106 and through a substantially circular cylindrical rod seal 122 formed integral with the diaphragm 105. That is, the tie rod 114 slidably and air-tightly extends relative to the power piston 106 and the diaphragm 105.

There are two tie rods 114 (only one of them is shown in FIGS. 2 and 3) spaced from each other in the diametrical direction of the front and rear shells 102 and 103. The mounting thread portion 115 of each tie rod 114 is used to secure the master cylinder 110 to the front shell 102, and the securing thread portion 116 is used to secure the housing 104 to the vehicle body, with the securing bearing surface 113 abutting against the above-described dash panel (not shown) of the vehicle body. In addition, the securing bearing surface 113 has rear bolts 123 secured thereto by caulking. The rear bolts 123 are used to abut the securing bearing surface 113 against the dash panel.

The valve body 111 has an integral double-walled structure at an end thereof closer to the master cylinder 110. The double-walled structure comprises a small-diameter cylindrical portion 111E and a large-diameter cylindrical portion 111A divergently enlarged in diameter around the outer periphery of the small-diameter cylindrical portion 111E. The large-diameter cylindrical portion 111A is inserted into respective central openings 105A and 106A of the diaphragm 105 and the power piston 106. The large-diameter cylindrical portion 111A has an outer peripheral groove 111B formed on the outer periphery thereof. The peripheral edge of the central opening 105A of the diaphragm 105 is fitted in the outer peripheral groove 111B, thereby allowing the diaphragm 105 and the valve body 111 to be air-tightly connected to each other. The valve body 111 has a small-diameter tubular portion 111C formed at an end thereof closer to the brake pedal 19. The small-diameter tubular portion 111C extends through the variable-pressure chamber 108, which is formed in the housing 104, and is inserted through the cylindrical portion 112 of the rear shell 103 to extend to the outside of the housing 104. A seal member 124 is fitted between the small-diameter tubular portion 111C and the cylindrical portion 112 to slidably seal the small-diameter tubular portion 111C with respect to the housing 104. In addition, a bellows-shaped dust cover 125 is provided around the outer periphery of a part of the small-diameter tubular portion 111C extending from the cylindrical portion 112. One end of the dust cover 125 is secured to the cylindrical portion 112.

The valve body 111 has a disk-shaped reaction member 155 and an output rod 128 secured to the small-diameter cylindrical portion 111E. The output rod 128 has a rod-shaped distal end portion 128A abuttable against the primary piston 160. The output rod 128 has a proximal end portion 128B formed in the shape of a cup to contain the reaction member 155. The proximal end portion 128B of the output rod 128 is fitted to the outer periphery of the small-diameter cylindrical portion 111E. The output rod 128 transmits a thrust of the valve body 111 to the primary piston 160 of the master cylinder 110 through the reaction member 155.

The valve body 111 has an annular reaction force receiving member 152 secured by being fitted to the inner periphery of the small-diameter cylindrical portion 111E. The reaction force receiving member 152 transmits force transmitted thereto from the reaction member 155 to the valve body 111. The front end of the reaction force receiving member 152 abuts against the reaction member 155, together with the front end of the small-diameter cylindrical portion 111E of the valve body 111. The reaction force receiving member 152 axially movably supports a substantially circular columnar reaction force transmitting member 153 received therein. The reaction force transmitting member 153 is urged toward the reaction member 155 by a reaction force adjusting spring 157, which is a compression coil spring, interposed between an annular spring retaining member 153A fitted to the outer periphery of the reaction force transmitting member 153 and a spring retaining member 152B secured to a circular cylindrical portion 152A formed at the rear end of the reaction force receiving member 152. The front end 153B of the reaction force transmitting member 153 is abuttable against the reaction member 155. In a non-braking state where the brake pedal 19 is not operated, the front end 153B of the reaction force transmitting member 153 is abutting against the reaction member 155 to apply a set load to the reaction force adjusting spring 157.

In this embodiment, the reaction member 155 is provided in such a manner as to be contained in the proximal end portion 128B of the output rod 128, which is formed in the shape of a cup. It should be noted, however, that the reaction member 155 may be contained in the small-diameter cylindrical portion 111E of the valve body 111 or in a recess formed in the reaction force receiving member 152. In such a case, the output rod 128 can have a simplified shape by forming the proximal end portion 128B in the shape of a disk.

The valve body 111 has a plunger 131 provided in the small-diameter tubular portion 111C. The plunger 131 is axially slidably supported in the small-diameter tubular portion 111C at the border with the small-diameter cylindrical portion 111E. When the brake pedal 19 is not operated, the front end 131A of the plunger 131 faces the rear end 153C of the reaction force transmitting member 153 across a gap C1 as shown in FIG. 3. The rear end of the plunger 131 is connected to the distal end of an input rod 133 inserted into the valve body 111 from the rear end of the small-diameter tubular portion 111C. The plunger 131 moves in response to the movement of the input rod 133. The proximal end portion of the input rod 133 extends to the outside through an air-permeable dust seal 134 fitted into the rear end portion of the small-diameter tubular portion 111C of the valve body 111. The input rod 133 has a clevis 135 secured to the proximal end thereof to connect the brake pedal 19 to the input rod 133. The clevis 135 has clevis holes 135A. The brake pedal 19 has a clevis pin 19A inserted therethrough. The clevis pin 19A is further inserted through the clevis holes 135A of the clevis 135, thereby connecting together the input rod 133 and the brake pedal 19. In addition, a control valve element 132 is provided in the small-diameter tubular portion 111C of the valve body 111. The control valve element 132 is on-off controlled by the plunger 131. The control valve element 132 is urged toward the plunger 131 in a valve-closing direction by a valve spring 141 retained at one end thereof by the input rod 133.

The small-diameter tubular portion 111C of the valve body 111 is provided with a constant-pressure passage 136 extending in the axial direction of the valve body 111 to communicate with the constant-pressure chamber 107 and a variable-pressure passage 137 extending in the radial direction of the valve body 111 to communicate with the variable-pressure chamber 108. The small-diameter tubular portion 111C has a vacuum valve seat 111D formed near the opening of the constant-pressure passage 136. The control valve element 132 is abuttable against the vacuum valve seat 111D. The plunger 131 has an atmosphere valve seat 131B formed on the rear end thereof. The control valve element 132 is abuttable against the atmosphere valve seat 131B. The control valve element 132 switches between connection and cut-off of the constant-pressure passage 136 and the dust seal 134-side atmosphere with respect to the variable-pressure passage 137 according to the relative displacement between the valve body 111 and the plunger 131. When the brake pedal 19 is not operated, the constant-pressure passage 136 and the dust seal 134-side atmosphere are cut off from the variable-pressure passage 137. In other words, the booster 101 is a balance-type pneumatic booster in which, in a non-braking state, the variable-pressure chamber 108 is cut off from both the constant-pressure chamber 107 and the atmosphere. When the brake pedal 19 is operated to cause the plunger 131 to advance relative to the valve body 111, the variable-pressure passage 137 is connected to the atmosphere (dust seal 134 side), with the constant-pressure passage 136 left cut off from the variable-pressure passage 137. At this time, the variable-pressure passage 137 is open to the atmosphere through the dust seal 134.

A stop key 138 is inserted in the variable-pressure passage 137 extending radially through the small-diameter tubular portion 111C of the valve body 111. The stop key 138 defines the retract position of the valve body 111 by engaging with a stepped portion of the cylindrical portion 112 of the rear shell 103. In addition, the stop key 138 limits the amount of relative displacement between the valve body 111 and the plunger 131 by movably engaging in an outer peripheral groove on the plunger 131.

A return spring 139 is provided between the front wall of the front shell 102 and a spring retainer 151 secured to the large-diameter cylindrical portion 111A at the front end of the valve body 111. The return spring 139 urges the valve body 111 toward the retract position thereof. In addition, a return spring 140 is provided in the small-diameter tubular portion 111C at a position closer to the rear end of the valve body 111 to urge the input rod 133 toward the retract position thereof.

The brake pedal 19 is constantly urged toward a non-braking position thereof by a reaction force spring 159. Consequently, the input rod 133 of the booster 101 is constantly urged to a non-braking position thereof by the reaction force spring 159 through the brake pedal 19 and the clevis 135.

The master cylinder 110 has a circular cylindrical primary piston 160 fitted in an opening-side part thereof. The primary piston 160 has a cup-shaped distal end portion. The master cylinder 110 further has a cup-shaped secondary piston 161 fitted in a bottom-side part thereof. The rear end portion of the primary piston 160 projects from the opening of the master cylinder 110 and abuts against the distal end of the output rod 128 in the constant-pressure chamber 107. The master cylinder 110 has two hydraulic pressure chambers, i.e. a primary chamber 162 and a secondary chamber 163, formed therein by the primary piston 160 and the secondary piston 161. The primary chamber 162 and the secondary chamber 163 are provided with hydraulic pressure ports 164 and 165, respectively. The hydraulic pressure ports 164 and 165 are connected to the wheel cylinders Ba to Bd of the hydraulic brakes for the wheels Wa to Wd through the hydraulic control device 5 comprising hydraulic circuits of two systems (see FIG. 1).

The upper side of the side wall of the master cylinder 110 is provided with reservoir ports 166 and 167 for connecting the primary chamber 162 and the secondary chamber 163 to a reservoir 10. Two seal members 168A and 168B seal between the cylinder bore of the master cylinder 110 and the primary piston 160. Similarly, two seal members 169A and 169B seal between the cylinder bore of the master cylinder 110 and the secondary piston 161. The seal members 168A and 168B are disposed to axially face each other across the reservoir port 166. When the primary piston 160 is in an initial position shown in FIGS. 2 and 3, the primary chamber 162 communicates with the reservoir port 166 through a port 170 provided in the side wall of the primary piston 160. When the primary piston 160 advances from the initial position by a predetermined idle stroke S1 (see FIG. 3), the primary chamber 162 is cut off from the reservoir port 166 by the seal member 168B. Consequently, the primary chamber 162 is pressurized. Similarly, the seal members 169A and 169B are disposed to axially face each other across the reservoir port 167. When the secondary piston 161 is in an initial position shown in FIGS. 2 and 3, the secondary chamber 163 communicates with the reservoir port 167 through a port 171 provided in the side wall of the secondary piston 161. When the secondary piston 161 advances from the initial position by a predetermined idle stroke S1, the secondary chamber 163 is cut off from the reservoir port 167 by the seal member 169B. Consequently, the secondary chamber 163 is pressurized. In this embodiment, the position reached by each of the pistons 160 and 161 when advancing by the predetermined idle stroke S1 is the predetermined brake pedal position at which the hydraulic pressure generating device starts to supply the hydraulic fluid to the wheel cylinder in the present invention. Further, the amount of operation of the brake pedal 19 required for each of the pistons 160 and 161 to advance by the predetermined idle stroke S1 from the initial position is the predetermined brake pedal operation quantity at which the hydraulic pressure generating device starts to supply the hydraulic fluid to the wheel cylinder in the present invention.

A spring assembly 172 is interposed between the primary piston 160 and the secondary piston 161 in the primary chamber 162. A return spring 173 is interposed between the bottom of the master cylinder 110 and the secondary piston 161 in the secondary chamber 163. The return spring 173 is a compression coil spring. The spring assembly 172 comprises a compression coil spring held in a predetermined compressed state by an expandable retainer so that the spring assembly 172 can be compressed against the spring force thereof. The primary piston 160 and the secondary piston 161 normally move simultaneously to pressurize the primary chamber 162 and the secondary chamber 163 simultaneously.

Next, the operation of the booster 101 will be explained.

In the non-braking state shown in FIGS. 2 and 3, i.e. when the brake pedal 19 is not depressed, the plunger 131 is in the non-braking position shown in the figures, and the constant-pressure chamber 107 and the variable-pressure chamber 108 are at the same pressure. Therefore, no thrust is generated in the power piston 106. At this time, the constant-pressure passage 136 and the variable-pressure passage 137 are cut off by the control valve element 132. In other words, the constant-pressure chamber 107 and the variable-pressure chamber 108 are cut off by the control valve element 132.

Depression of the brake pedal 19 is started, and the plunger 131 is advanced by the input rod 133 against the spring force of the reaction force spring 159 connected to the brake pedal 19 and the spring force of the return spring 140 by a distance corresponding to the gap C1 between the front end 131A of the plunger 131 and the rear end 153C of the reaction force transmitting member 153. At this time, the plunger 131 separates from the control valve element 132, causing the variable-pressure passage 137 to be opened to the atmosphere, thereby allowing the air to be introduced into the variable-pressure chamber 108. Consequently, a differential pressure is produced between the constant-pressure chamber 107 and the variable-pressure chamber 108. The differential pressure generates thrust in the power piston 106, and the valve body 111 advances, causing the output rod 128 to advance through the reaction member 155. Accordingly, the output rod 128 presses and advances the primary piston 160 of the master cylinder 110.

Figure 4:
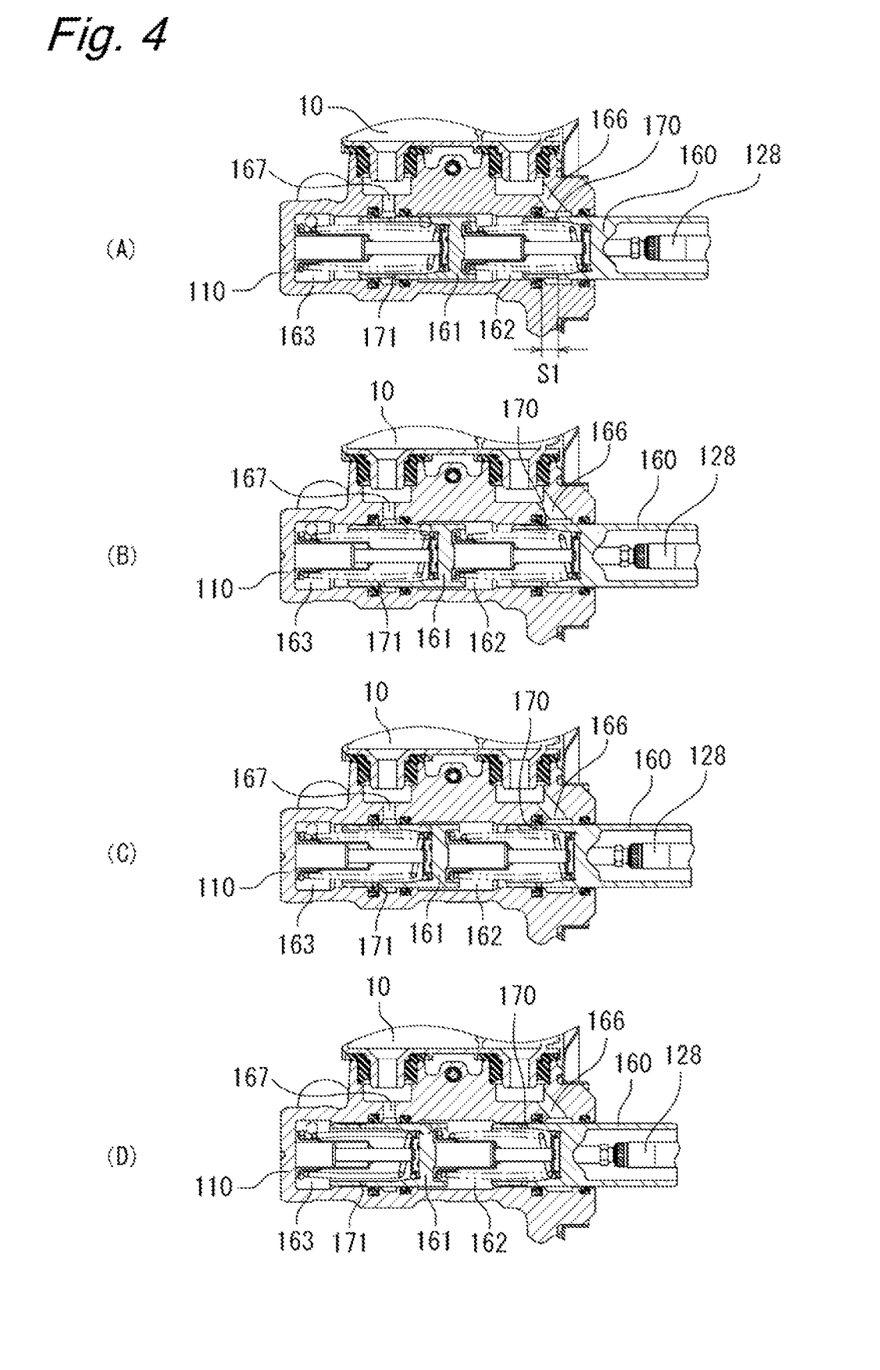
FIG. 4 is a vertical sectional view of a main part of the master cylinder, showing various operating states of the brake apparatus shown in FIG. 1.

At this time, no hydraulic pressure is generated in the master cylinder 110 and no reaction force from hydraulic pressure is generated, despite the advancement of the primary piston 160, until the primary piston 160 reaches the position for closing the port 170 (see part (C) of FIG. 4), i.e. until the primary piston 160 advances by a distance corresponding to the idle stroke S1. Accordingly, only a reaction force from the spring forces of the reaction force spring 159 and the return spring 140 acts on the brake pedal 19.

The brake pedal 19 is further depressed, and the primary piston 160 advances by a distance corresponding to the idle stroke S1 to reach the position for closing the ports 170 and 171 (see part (C) of FIG. 4). At this time, the ports 170 and 171 are closed by the seal members 168A and 168B, resulting in a hydraulic pressure being generated in the master cylinder 110, and a reaction force from the hydraulic pressure acts on the valve body 111 through the reaction member 155 and is also transmitted to the reaction force transmitting member 153 through the reaction member 155. The reaction force transmitting member 153 does not move until the reaction force transmitted to the reaction force transmitting member 153 reaches the set load of the reaction force adjusting spring 157. In addition, the gap C1, which is provided between the reaction force transmitting member 153 and the plunger 131, prevents the reaction force from the hydraulic pressure in the master cylinder 110 from being transmitted to the plunger 131. Therefore, only the reaction force from the spring forces of the reaction force spring 159 and the return spring 140 continues to act on the brake pedal 19. Thus, it is possible to obtain a favorable operation feeling of the brake pedal 19 independent of the change in the hydraulic pressure in the master cylinder 110.

The brake pedal 19 is further depressed, and the valve body 111 advances, causing the hydraulic pressure in the master cylinder 110 to increase, resulting in an increase in the reaction force from the hydraulic pressure. When the reaction force transmitted from the reaction member 155 to the reaction force transmitting member 153 exceeds the set load of the reaction force adjusting spring 157, the reaction force transmitting member 153 retracts and abuts against the plunger 131. Consequently, a part of the reaction force from the hydraulic pressure in the master cylinder 110 acts on the plunger 131. As a result, a reaction force increasing with the increase of hydraulic pressure in the master cylinder 110 is transmitted to the brake pedal 19 with a predetermined boost ratio. Thus, it is possible to obtain a stiff brake feeling that cannot be obtained with the reaction force spring 159 alone. Thereafter, when the brake pedal 19 is further depressed to reach the full-load point, the boost ratio becomes 1.

When the brake pedal 19 is returned to cancel the input to the input rod 133, the plunger 131 retracts, and the variable-pressure passage 137 is connected to the constant-pressure passage 136 while being cut off from the atmosphere by the control valve element 132. Thus, the differential pressure between the constant-pressure chamber 107 and the variable-pressure chamber 108 is canceled, and the thrust in the power piston 106 disappears. Consequently, the power piston 106 retracts following the movement of the plunger 131 to return to the non-braking position shown in FIGS. 2 and 3.

Next, the control of the hydraulic control device 5 and the regenerative brake device 8 by the controller 7 and the operations of the master cylinder 110 and the booster 101 will be explained with reference mainly to FIGS. 4 and 5. The controller 7 sets a target braking force for a stroke S of the input rod 133, which is a quantity of operation of the brake pedal 19, detected by the stroke sensor 20, and controls the operation of the hydraulic control device 5 so that the sum total of a braking force generated from the brake hydraulic pressure in the master cylinder 110 (master hydraulic braking force portion m), a braking force generated by the hydraulic control device 5 (controlled hydraulic braking force portion h), and a braking force generated by the regenerative brake device 8 (regenerative braking force portion r) becomes the target braking force.

Parts (A) to (D) of FIG. 4 show the positions of the primary and secondary pistons 160 and 161 in the master cylinder 110 relative to the stroke S of the input rod 133 during regenerative cooperative control. FIG. 5 shows, by way of example, the vehicle deceleration G obtained by the brake apparatus 200 during regenerative cooperative control, the vehicle deceleration M (broken line in FIG. 5) by the master hydraulic braking force portion m generated by the master cylinder 110, the vehicle deceleration R by the regenerative braking force portion r (hatched areas in FIG. 5) generated by the regenerative brake device 8, and the vehicle deceleration H by the controlled hydraulic braking force portion h (cross-hatched areas in FIG. 5) generated by the hydraulic control device 5.

First, depression of the brake pedal 19 is started from a non-braking position A0 (part (A) of FIG. 4), and regenerative braking is started at a braking start point A after a first section (1), which is an idle region before starting braking. Thereafter, braking is performed mainly by the regenerative braking force portion r generated by the regenerative brake device 8 during a second section (2) between the braking start point A and a maximum regenerative braking point B, exclusive, at which the regenerative brake device 8 reaches the state of maximum regenerative braking. The term "maximum regenerative braking", as used herein, means a maximum braking force obtainable from the regenerative brake device 8, which is set in the stage of designing the vehicle (maximum braking force often being expressed in terms of force or deceleration; in this embodiment, it is a deceleration of 0.15 G, for example).

During the second section (2), the target braking force is obtained by using the regenerative braking force portion r generated by the regenerative brake device 8 according to the stroke S of the input rod 133; therefore, the hydraulic control device 5 does not operate. However, when the regenerative operation is not much performed because of a vehicle speed reduction, an amount of electric power charged in the battery, etc., a sufficient braking force cannot be obtained by the regenerative brake device 8. Therefore, the hydraulic control device 5 is appropriately operated in the boosting mode to compensate for a lack of braking force to obtain the target braking force. It should be noted that, during the second section (2) before the maximum regenerative braking point B is reached, the hydraulic control device 5 may be operated in the boosting mode to start applying the controlled hydraulic braking force portion h. At this time, the master cylinder 110 does not generate a brake hydraulic pressure because the stroke S of the input rod 133 has not yet reached the idle stroke S1 of the primary piston 160. Therefore, the reservoir 10 and the hydraulic control device 5 are in connection with each other, and the hydraulic control device 5 can suck and supply the hydraulic fluid from the reservoir 10 to the wheel cylinders Ba to Bd to pressurize them. Meanwhile, a reaction force corresponding to the amount of operation of the brake pedal 19 is applied to the brake pedal 19 by the spring force of the reaction force spring 159.

Thereafter, the brake pedal 19 is continued to be depressed, and after the stroke S of the input rod 133 has reached the maximum regenerative braking point B, braking by the hydraulic control device 5 is started. More specifically, as the stroke S of the input rod 133 increases, the regenerative braking force portion r generated by the regenerative brake device 8 decreases at a constant rate. Therefore, in order to compensate for the decrement of the regenerative braking force portion r, the controlled hydraulic braking force portion h generated by the hydraulic control device 5 is increased. That is, what is called substitution control is performed. Consequently, in a third section (3) between the maximum regenerative braking point B and a master hydraulic braking start point C, exclusive, at which the stroke S of the input rod 133 reaches the idle stroke S1, the target braking force is generated by the sum total of the regenerative braking force portion r generated by the regenerative brake device 8 and the controlled hydraulic braking force portion h generated by the hydraulic control device 5.

During the third section (3) also, the master cylinder 110 does not generate a brake hydraulic pressure because the stroke S of the input rod 133 has not yet reached the idle stroke S1 of the primary piston 160. More specifically, the primary and secondary chambers 162 and 163 in the master cylinder 110 are in communication with the reservoir 10. Therefore, the hydraulic control device 5 operates in the boosting mode to suck the hydraulic fluid stored in the reservoir 10 through the primary and secondary chambers 162 and 163, which are hydraulic pressure chambers, and to supply the hydraulic fluid to the wheel cylinders Ba to Bd. At this time also, only the spring force of the reaction force spring 159 acts on the brake pedal 19, and a reaction force corresponding to the amount of operation of the brake pedal 19 acts thereon. It should be noted that, when the regenerative braking force generated by the regenerative brake device 8 becomes less than a predetermined proportion because of a vehicle speed reduction, an amount of electric power charged in the battery, etc., the hydraulic control device 5 may operate so as to increase the controlled hydraulic braking force portion h by an amount corresponding to the shortage of the regenerative braking force, thereby compensating for the lack of braking force.

In the above-mentioned Japanese Patent Application Publication No. 2006-96218, the idle stroke of the primary piston is set relative to the stroke S of the input rod 133 so that the maximum regenerative braking point B and the master hydraulic braking start point C occur at the same timing. In such a case, when the maximum regenerative braking point B is reached, the hydraulic pressure chambers in the master cylinder are cut off from the reservoir and thus closed. If substitution control is performed in this state, the hydraulic control device supplies the brake fluid to the wheel cylinders from the closed hydraulic pressure chambers. Consequently, the amount of brake fluid in the hydraulic pressure chambers reduces, resulting in the occurrence of what is called piston sucking phenomenon, in which the pistons in the master cylinder are drawn toward the hydraulic pressure chambers by suction. That is, the hydraulic pressure in the master cylinder varies, causing degradation of the brake pedal operation feeling.

In this regard, in this embodiment, the master hydraulic braking start point C is displaced from the maximum regenerative braking point B in the stroke increasing direction relative to the stroke S of the input rod 133. In other words, a brake pedal position at which the brake pedal is depressed beyond the maximum regenerative braking pedal depressed position is defined as the predetermined brake pedal position at which the hydraulic fluid is supplied to the wheel cylinder. Therefore, when the maximum regenerative braking point B is reached, the hydraulic pressure chambers in the master cylinder 110 are in communication with the reservoir 10, and the hydraulic control device 5 performs substitution control in this state. That is, the hydraulic control device 5 supplies the brake fluid to the wheel cylinders Ba to Bd from the reservoir 10. Consequently, there is no reduction in the amount of brake fluid in the hydraulic pressure chambers in the master cylinder 110, and no piston sucking phenomenon occurs in the master cylinder 110. Accordingly, even when the hydraulic control device 5 operates during the regenerative cooperative control, it is possible to suppress the degradation of the operation feeling of the brake pedal 19.

Next, when the stroke S of the input rod 133 reaches the master hydraulic braking start point C, the ports 170 and 171 of the primary and secondary pistons 160 and 161 in the master cylinder 110 are closed, and the stroke of the primary piston 160 reaches the idle stroke S1. Thereafter, the primary chamber 162 and the secondary chamber 163 are pressurized by the advancement of the primary and secondary pistons 160 and 161. Thus, a brake hydraulic pressure is generated in the master cylinder 110. During a fourth section (4) from the master hydraulic braking start point C to a regenerative braking terminating point D at which the regenerative braking performed by the regenerative brake device 8 terminates, a target braking force corresponding to the stroke S is generated by the sum total of the regenerative braking force portion r generated by the regenerative brake device 8, the controlled hydraulic braking force portion h generated by the hydraulic control device 5, and the master hydraulic braking force portion m generated from the brake hydraulic pressure in the master cylinder 110.

At this time, the hydraulic control device 5 continues to perform the substitution control to compensate for the decrement of the regenerative braking force portion r generated by the regenerative brake device 8 because the regenerative braking force portion r continues to decrease at a constant rate, thereby further increasing the controlled hydraulic braking force portion h generated by the hydraulic control device 5. When the brake hydraulic pressure in the master cylinder 110, which is generated according to the stroke S, has increased to a certain extent, the controlled hydraulic braking force portion h generated by the hydraulic control device 5 is switched to decrease. At this time, the hydraulic control device 5 gradually switches from the boosting mode to the normal braking mode by controlling the supply valves 35A and 35B and the boost valves 41A and 41B on the basis of the relationship with the master hydraulic braking force portion m and the regenerative braking force portion r generated by the regenerative brake device 8. That is, the controller 7 sets the rate of increase in amount of hydraulic fluid with respect to the amount of depression of the brake pedal such that the rate of increase in amount of hydraulic fluid is lower before than on and after the time the brake pedal is depressed to the maximum regenerative braking pedal depressed position.

If the idle stroke of the primary piston is set relative to the stroke S of the input rod 133 so that the maximum regenerative braking point B and the master hydraulic braking start point C occur coincidentally at the same timing, as in the above-mentioned Japanese Patent Application Publication No. 2006-96218, the brake fluid quantity necessary for generating a brake hydraulic pressure required for the hydraulic control device to perform substitution control is a brake fluid quantity V necessary for generating a brake hydraulic pressure corresponding to the regenerative braking force portion generated during the maximum regenerative braking. Thus, an amount of brake fluid corresponding to the brake fluid quantity V disappears from the hydraulic pressure chamber in the closed master cylinder, resulting in a change in the hydraulic pressure in the master cylinder.

In this regard, in this embodiment, the master hydraulic braking start point C is displaced from the maximum regenerative braking point B in the stroke increasing direction relative to the stroke S of the input rod 133. Accordingly, at the master hydraulic braking start point C, at which the hydraulic pressure chambers in the master cylinder 110 are cut off from the reservoir 10, the regenerative braking force portion has become smaller than at the time of maximum regenerative braking. Therefore, the brake fluid quantity necessary for generating a brake hydraulic pressure required for the hydraulic control device 5 to perform substitution control is a brake fluid quantity V1, which is smaller than the above-described brake fluid quantity V. Accordingly, the change in the hydraulic pressure in the master cylinder 110 caused by the operation of the hydraulic control device 5 can be reduced to a sufficiently small level. Thus, it is possible to suppress the degradation of the operation feeling of the brake pedal 19.

The master cylinder 110 presses the reaction force transmitting member 153 toward the plunger 131 through the reaction member 155 with a part of the reaction force from the brake hydraulic pressure transmitted from the primary piston 160. At this time, the reaction force transmitting member 153 is prevented from abutting against the plunger 131 by the set load of the reaction force adjusting spring 157, and hence the reaction force from the hydraulic pressure in the master cylinder 110 does not act on the brake pedal 19. Accordingly, a favorable brake pedal operation feeling can be maintained.

Thus, the regenerative braking force portion generated by the regenerative brake device 8 is gradually reduced from the maximum regenerative braking point B, while compensating for the reduction in the braking force by the controlled hydraulic braking force portion generated by the hydraulic control device 5, and thereafter, braking by the brake hydraulic pressure generated in the master cylinder 110 is started, thereby allowing the braking mode to be smoothly shifted from the regenerative braking to the braking by the brake hydraulic pressure in the master cylinder 110. Thus, the driver of the vehicle can operate the brake pedal 19 without feeling uncomfortable.

When the input rod 133 further advances and the stroke S reaches the regenerative braking terminating point D, the regenerative braking by the regenerative brake device 8 terminates, and the control in the boosting mode by the hydraulic control device 5 also terminates. In the subsequent fifth section (5), braking is mainly performed by the brake hydraulic pressure generated in the master cylinder 110. At this time, the reaction force transmitted from the primary piston 160 to the reaction force transmitting member 153 through the reaction member 155 causes the reaction force transmitting member 153 to retract against the spring force of the reaction force adjusting spring 157 and to abut against the plunger 131. In this way, the reaction force is fed back to the input rod 133 and the brake pedal 19. Further, negative-pressure boosting is performed by the booster 101, and as the input rod 133 further continues to advance, the full-load point (not shown) is reached eventually.

Thus, even when the hydraulic control device 5 operates to compensate for the reduction in the regenerative braking force and causes the master cylinder hydraulic pressure to change on and after the maximum regenerative braking point B, the stroke S is within the idle stroke S1, and no hydraulic pressure is generated in the master cylinder 110. Therefore, it is possible to suppress the degradation of the operation feeling of the brake pedal 19. In addition, it is unnecessary to reduce the regenerative braking force portion generated by the regenerative brake device 8 in order to suppress the change in the hydraulic pressure in the master cylinder 110. Therefore, the regenerative braking force portion can be utilized effectively, and energy can be recovered efficiently.

The hydraulic control device 5 may operate to perform substitution control to compensate for a reduction in the regenerative braking force caused by a reduction in the vehicle speed, or the like, after the stroke S has reached the master hydraulic braking start point C, at which braking by the brake hydraulic pressure in the master cylinder 110 is started. In such a case, the stroke S has already reached the idle stroke S1, and the ports 170 and 171 have already been closed. Therefore, a change in the brake hydraulic pressure in the master cylinder 110 caused by the operation of the hydraulic control device 5 is transmitted to the reaction force transmitting member 153 through the reaction member 155. In this regard, the above-described embodiment has the following advantages, as compared to the background art in which the master hydraulic braking start point C and the maximum regenerative braking point B are set at the same timing. That is, the regenerative braking force portion has already become sufficiently small at the master hydraulic braking start point C as a result of reducing from the level at the maximum regenerative braking point B. Consequently, the hydraulic control device 5 supplies a correspondingly reduced amount of brake fluid to the wheel cylinders Ba to Bd in order to compensate for the reduction in the regenerative braking force. Therefore, the change in the hydraulic pressure in the master cylinder 110 caused by the operation of the hydraulic control device 5 can be reduced to a sufficiently small level. Thus, the amount of brake fluid supplied from the master cylinder 110 by the hydraulic pressure chamber reduces, and it is therefore possible to suppress the degradation of the operation feeling of the brake pedal 19.

Figure 5:
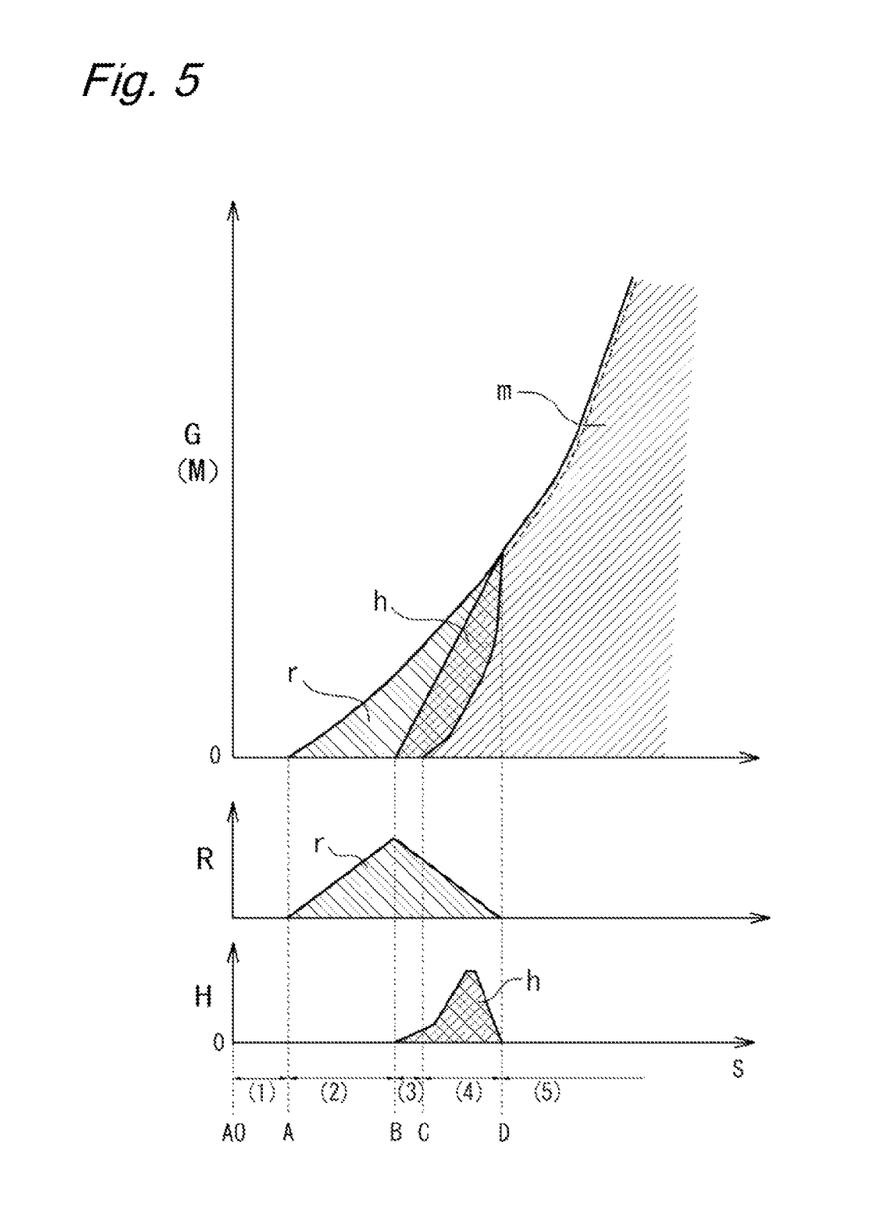
FIG. 5 is a graph showing characteristics of the brake apparatus shown in FIG. 1.

It should be noted that, when braking not associated with regenerative cooperative control is performed, the controller 7 controls the hydraulic control device 5 to generate a braking force corresponding to the regenerative braking force portion r shown in FIG. 5, thereby preventing the driver from feeling the idle stroke S1 of the primary piston 160 in the master cylinder 110.

Next, a second embodiment of the present invention will be explained with reference to FIGS. 6 and 7. In the following description, members or portions similar to those of the first embodiment are denoted by the same reference numerals as used in the first embodiment, and only the points in which the second embodiment differs from the first embodiment will be explained in detail.

Figure 6:
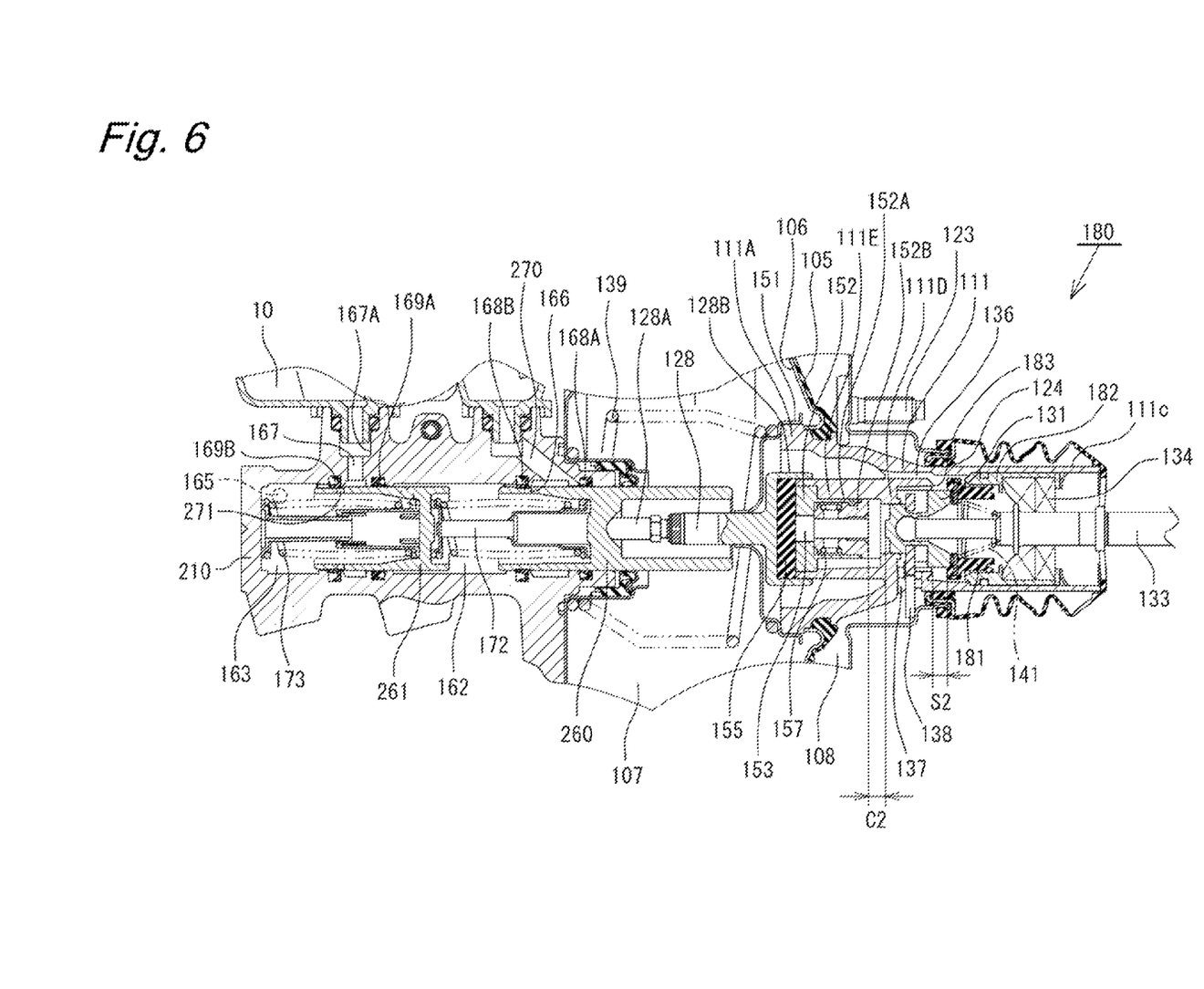
FIG. 6 is an enlarged vertical sectional view of main parts of a master cylinder and booster of a brake apparatus according to a second embodiment of the present invention.

The brake apparatus according to the second embodiment uses a booster 180 shown in FIG. 6 (only a main part thereof is shown in the figure). As shown in FIG. 6, a master cylinder 210 is not provided with the idle stroke S1. The master cylinder 210 has a primary piston 260, a secondary piston 261, and ports 270 and 271. The primary and secondary pistons 260 and 261 close the ports 270 and 271 to pressurize the primary and secondary chambers 162 and 163, respectively, after advancing only slightly, i.e. by a short idle stroke, from the initial positions shown in FIG. 5 in the same way as conventional master cylinders.

In the booster 180 according to this embodiment, a control valve element 181 is slidably and air-tightly fitted to a guide member 182 secured in the small-diameter tubular portion 111C of the valve body 111. The control valve element 181 is urged by the valve spring 141 to seat on the rear end of the plunger 131, thereby cutting off the constant-pressure passage 136 and the variable-pressure passage 137 from the atmosphere (dust seal 134 side). The valve body 111 has an annular seat portion 183, which is a constant-pressure valve seat, formed between the constant-pressure passage 136 and the variable-pressure passage 137. When the input rod 133 is in the non-braking position shown in FIG. 6, the control valve element 181 is disposed away from the seat portion 183 by a distance corresponding to an idle stroke S2, thereby allowing the constant-pressure passage 136 and the variable-pressure passage 137 to communicate with each other. In other words, the control valve element 181 and the seat portion 183 constitute a vacuum valve, and when the input rod 133 is in the non-braking position, the control valve element 181 and the seat portion 183 are placed away from each other, thereby setting the idle stroke S2. That is, in this embodiment, the idle stroke S2 is provided in the booster 180 in place of the idle stroke S1 provided in the master cylinder 110 in the first embodiment. In this embodiment, the position at which the control valve element 181 abuts against the seat portion 183 by advancing from the initial position by a distance corresponding to a predetermined idle stroke S2 is the predetermined brake pedal position at which the hydraulic pressure generating device starts to supply the hydraulic fluid to the wheel cylinder in the present invention. In addition, the amount of operation of the brake pedal 19 required for the control valve element 181 to advance from the initial position by the predetermined idle stroke S2 to abut against the seat portion 183 is the predetermined brake pedal operation quantity at which the hydraulic pressure generating device starts to supply the hydraulic fluid to the wheel cylinder in the present invention.

In the booster 180, as the input rod 133 advances, the control valve element 181 is pressed by the valve spring 141 to advance, together with the plunger 131. When the stroke S of the input rod 133 reaches the idle stroke S2, the control valve element 181 seats on the seat portion 183 to cut off the communication between the constant-pressure passage 136 and the variable-pressure passage 137. As the input rod 133 further advances, the plunger 131 separates from the control valve element 181 while canceling the gap C2 formed between the distal end of the plunger 131 and the reaction force transmitting member 153, and allows the variable-pressure passage 137 to communicate with the atmosphere while keeping the constant-pressure passage 136 and the atmosphere cut off from each other. It should be noted that the gap C2 is slightly larger than the idle stroke S2 between the control valve element 181 and the seat portion 183 when the input rod 133 is in the non-braking position shown in FIG. 6 and part (A) of FIG. 7.

Figure 7:
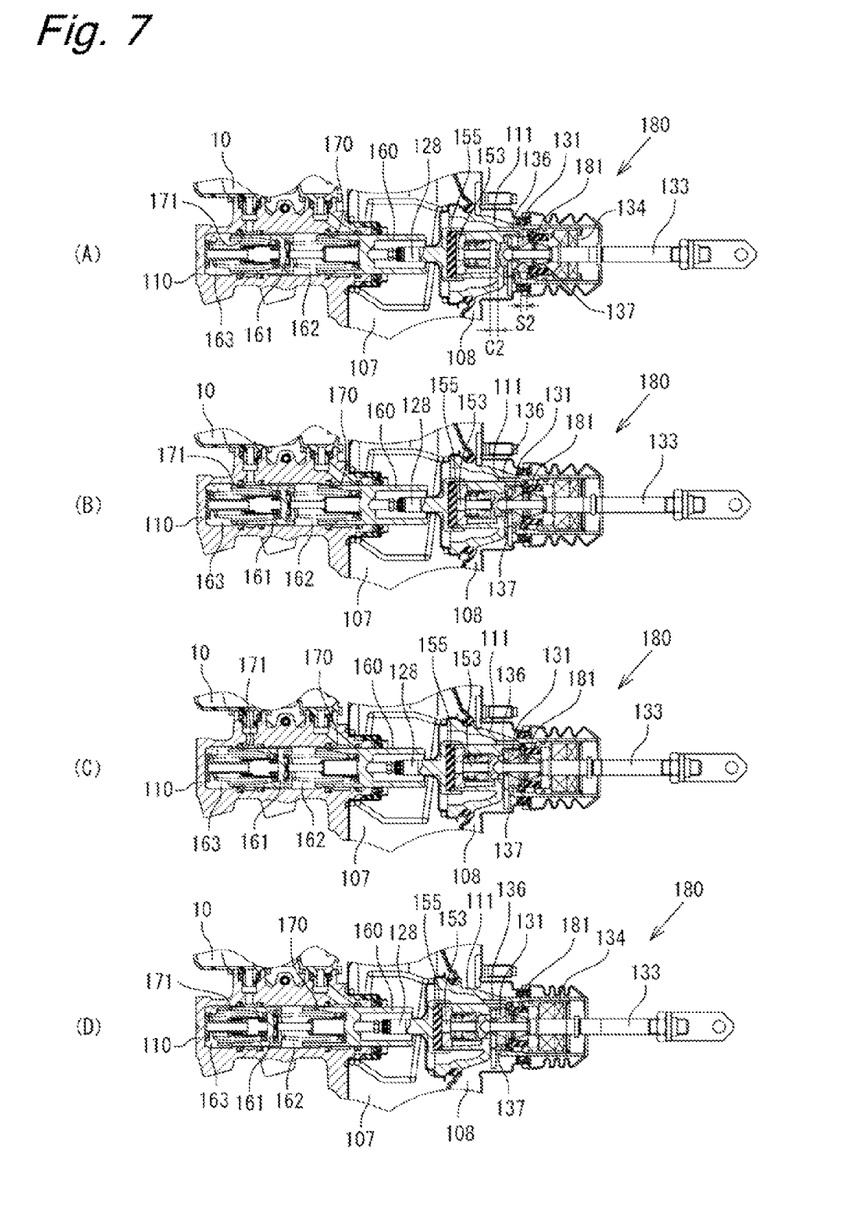
FIG. 7 is a fragmentary vertical sectional view showing various operating states of the master cylinder and the booster shown in FIG. 6.

Thus, when the brake pedal 19 is depressed from the non-braking position shown in FIG. 6 and part (A) of FIG. 7 and consequently the input rod 133 advances, the communication between the constant-pressure passage 136 and the variable-pressure passage 137 and the cut-off between the variable-pressure passage 137 and the atmosphere are maintained until the stroke S of the input rod 133 reaches the idle stroke S2. Therefore, during this period of time, no differential pressure is produced between the constant-pressure chamber 107 and the variable-pressure chamber 108, and the valve body 111 does not advance. In addition, the plunger 131 cannot abut against the reaction force transmitting member 153 because of the presence of the gap C2. Accordingly, the output rod 128 does not press the primary piston 260, and hence the master cylinder 210 does not generate a brake hydraulic pressure. Therefore, the reservoir 10 and the hydraulic control device 5 are in connection with each other, and the hydraulic control device 5 can suck and supply the hydraulic fluid from the reservoir 10 to the wheel cylinders Ba to Bd to pressurize them.

As shown in part (B) of FIG. 7, as the input rod 133 further advances and the stroke S reaches the idle stroke S2, the control valve element 181 seats on the seat portion 183 to cut off the constant-pressure passage 136 and the variable-pressure passage 137 from each other. At this time, the plunger 131 does not abut against the reaction force transmitting member 153 because the gap C2 is slightly larger than the idle stroke S2.

As shown in part (C) of FIG. 7, as the input rod 133 further advances, the plunger 131 separates from the control valve element 181, thereby allowing the variable-pressure passage 137 to be communicated with the atmosphere. Consequently, the air is introduced into the variable-pressure chamber 108 through the variable-pressure passage 137, resulting in a differential pressure between the constant-pressure chamber 107 and the variable-pressure chamber 108. Thus, thrust is generated in the power piston 106. The thrust causes the valve body 111 to advance and to move the output rod 128 through the reaction member 155, thus pressing the primary piston 260. Consequently, the ports 170 and 171 are closed, and a brake hydraulic pressure is generated in the master cylinder 210. As the valve body 111 advances, the control valve element 181 seats on the seat portion 183 to cut off the variable-pressure passage 137 from the atmosphere. Thus, the differential pressure between the constant-pressure chamber 107 and the variable-pressure chamber 108, i.e. the thrust of the power piston 106, is maintained. Accordingly, the valve body 111 moves following the movement of the plunger 131.

At this time, the reaction force from the brake hydraulic pressure in the master cylinder 210 is transmitted from the primary piston 160 to the valve body 111 through the reaction member 155. A part of the reaction force is also transmitted to the reaction force transmitting member 153 through the reaction member 155. However, until the reaction force reaches the set load of the reaction force adjusting spring 157, the reaction force transmitting member 153 does not move and does not abut against the plunger 131, which is separate from the reaction force transmitting member 153 as a result of the movement of the valve body 111. Therefore, the reaction force from the hydraulic pressure in the master cylinder 110 does not act on the plunger 131, but only the reaction force from the spring forces of the reaction force spring 159 and the valve spring 141 acts on the plunger 131.

As shown in part (D) of FIG. 7, as the input rod 133 further advances, the brake hydraulic pressure in the master cylinder 110 further increases, and the reaction force from the hydraulic pressure increases. When the reaction force acting on the reaction force transmitting member 153 through the reaction member 155 exceeds the spring force of the reaction force adjusting spring 157, the reaction force transmitting member 153 retracts and abuts against the plunger 131. Consequently, a part of the reaction force from the hydraulic pressure in the master cylinder 110 acts on the plunger 131. As a result, a reaction force increasing with the increase of hydraulic pressure in the master cylinder 110 is transmitted to the brake pedal 19 with a predetermined boost ratio determined by the pressure-receiving area ratio of the reaction member 155. Thus, it is possible to obtain a stiff brake feeling that cannot be obtained with the reaction force spring 159 alone.

When the brake pedal 19 is returned to cancel the input to the input rod 133, the plunger 131 retracts, and the variable-pressure passage 137 is connected to the constant-pressure passage 136 while being cut off from the atmosphere by the control valve element 180. Thus, the differential pressure between the constant-pressure chamber 107 and the variable-pressure chamber 108 is canceled, and the thrust in the power piston 106 disappears. Consequently, the power piston 106 retracts following the movement of the plunger 131 to return to the non-braking position shown in FIG. 6 and part (A) of FIG. 7.

Thus, input-output characteristics as shown in FIG. 5, which are similar to those of the master cylinder 110 and the booster 101 in the first embodiment, can be obtained by the combination of the master cylinder 210, which is not additionally provided with an idle stroke, and the booster 180, which is provided with the idle stroke S2, according to the second embodiment. Accordingly, it is possible to obtain advantageous effects similar to those of the first embodiment by applying the master cylinder 210 and the booster 180 according to the second embodiment to the brake apparatus 200. In such a case, an ordinary master cylinder that is not additionally provided with an idle stroke can be used as the master cylinder 110. Thus, costs can be reduced.

Figure 8:
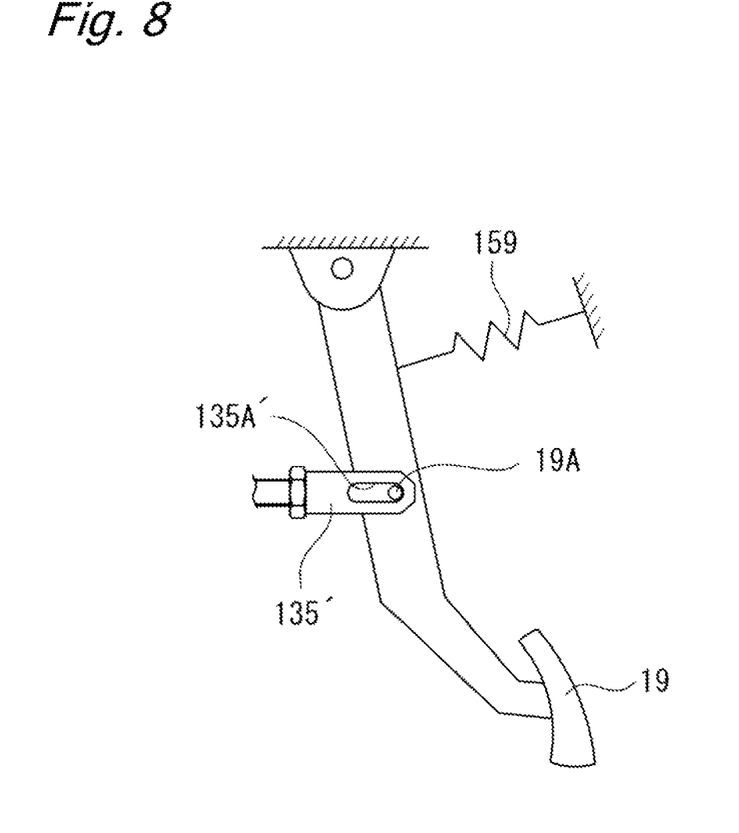
FIG. 8 is a diagram showing a modification of a clevis shown in FIG. 2.

It should be noted that, in the first embodiment, the idle stroke S1 is set in the master cylinder 110, and, in the second embodiment, the idle stroke S2 is set in the booster 180. As another scheme of providing an idle stroke, the clevis holes 135A of the clevis 135, shown in FIG. 2, may be formed as shown in FIG. 8. In the modification shown in FIG. 8, the clevis holes 135A' of the clevis 135' are formed as slots elongated in the stroke direction of the input rod 133, thereby setting an idle stroke. By so doing, the idle stroke can be adjusted easily without the need to adjust any of the internal pans of the master cylinder and the booster.

Although in the foregoing first and second embodiments the regenerative braking force portion generated by the regenerative brake device 8 lowers linearly at a predetermined rate in the sections (3) and (4) shown in FIG. 5 in the above-described examples, the regenerative braking force portion may decrease curvilinearly or stepwisely. The arrangement may also be such that the regenerative braking force portion is not lowered but kept at the level at the maximum regenerative braking point B. In such a case, the regenerative braking force portion in the sections (3) and (4) is prevented from increasing in excess of the level at the maximum regenerative braking point B as a peak. By so doing, even when the hydraulic control device 5 operates to compensate for a reduction in regenerative braking force caused by a reduction in the vehicle speed, for example, it is possible to suppress the change in the brake hydraulic pressure in the master cylinder 110 and to maintain a favorable operation feeling of the brake pedal 19.

Although in the foregoing embodiments a tandem master cylinder is used by way of example, a single-type master cylinder may be used when the hydraulic circuits of two systems are not needed. Although in the foregoing embodiments the vacuum source is an engine intake pipe, the present invention is not limited thereto. The vacuum source may be an electric motor-driven vacuum pump or the like. Although in the foregoing description the booster uses a pneumatic actuator as a boost source, the present invention is not limited thereto. It is also possible to use other types of actuators, e.g. an electric motor-driven actuator, or a hydraulic actuator.

Further, although in the foregoing embodiments the boosters 101 and 180 are each a single-type pneumatic booster having a pneumatic actuator as a boost source, the boosters 101 and 180 may each be a tandem pneumatic booster having two pairs of constant- and variable-pressure chambers formed in a housing. Further, the boosters 101 and 180 may each be an electric motor-driven booster having an electric motor-driven actuator as a boost source, or a hydraulic booster having a hydraulic actuator as a boost source.

Although in the foregoing embodiments the housing 104 of the booster 101 is provided with the tie rods 114 extending therethrough from the front shell 102 to the securing bearing surface 113 of the rear shell 103, the housing 104 may be configured without being provided with the tie rods 114.

Although in the foregoing embodiments the idle stroke (predetermined brake pedal position; predetermined brake pedal operation quantity) is set in one of the devices, i.e. master cylinder, booster, or clevis, the idle stroke (predetermined brake pedal position; predetermined brake pedal operation quantity) may be set to extend over a plurality of ones of the above-described devices.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-081445, filed on Mar. 30, 2012. The entire disclosure of Japanese Patent Applications No. 2012-081445, filed on Mar. 30, 2012 including specification, claims, drawings and summary is incorporated herein by reference in its entirety.

What is claimed is:

1. A brake apparatus comprising:
a regenerative brake device applying a regenerative braking force to a wheel of a vehicle by generating electric power from rotation of the wheel according to a depressed position of a brake pedal;
a hydraulic pressure generating device supplying a hydraulic fluid to a wheel cylinder when the brake pedal is depressed to at least a predetermined brake pedal position; and
a pump mechanism delivering the hydraulic fluid from the hydraulic pressure generating device to the wheel cylinder by a pump;
wherein the pump mechanism has already supplied the hydraulic fluid to the wheel cylinder when the brake pedal is depressed beyond a maximum regenerative braking pedal depressed position at which the regenerative brake device generates a maximum regenerative braking force, and
wherein, in the hydraulic pressure generating device, the predetermined brake pedal position is set to a position where the brake pedal is depressed beyond the maximum regenerative braking pedal depressed position.

2. The brake apparatus of claim 1, wherein the hydraulic pressure generating device transmits a reaction force from a hydraulic pressure generated therein to the brake pedal after the brake pedal is depressed beyond the predetermined brake pedal position.

3. The brake apparatus of claim 1, wherein the pump mechanism starts to supply the hydraulic fluid to the wheel cylinder when the brake pedal is depressed to the maximum regenerative braking pedal depressed position.

4. The brake apparatus of claim 1, wherein the pump mechanism starts to supply the hydraulic fluid to the wheel cylinder before the brake pedal is depressed to the maximum regenerative braking pedal depressed position.

5. The brake apparatus of claim 4, wherein a rate of increase in amount of hydraulic fluid that the pump mechanism supplies with respect to an amount of depression of the brake pedal is set lower before than on and after a time the brake pedal is depressed to the maximum regenerative braking pedal depressed position.

6. The brake apparatus of claim 1, wherein the hydraulic pressure generating device has a master cylinder and a booster; and
the predetermined brake pedal position, at which the hydraulic pressure generating device supplies the hydraulic fluid to the wheel cylinder, being set by an idle stroke position in the master cylinder.

7. The brake apparatus of claim 6, wherein the booster has an input member connected to the brake pedal, the input member being arranged such that a reaction force from a hydraulic pressure generated in the master cylinder is transmitted to the input member after the brake pedal is depressed to the predetermined brake pedal position.

8. The brake apparatus of claim 1, wherein the hydraulic pressure generating device has a master cylinder and a booster;
the predetermined brake pedal position, at which the hydraulic pressure generating device supplies the hydraulic fluid to the wheel cylinder, being set by an idle stroke position in the booster.

9. The brake apparatus of claim 8, wherein the booster has an input member connected to the brake pedal, the input member being arranged such that a reaction force from a hydraulic pressure generated in the master cylinder is transmitted to the input member after the brake pedal is depressed to the predetermined brake pedal position.

10. The brake apparatus of claim 8, wherein the booster has a housing divided into a constant-pressure chamber and a variable-pressure chamber, an input member connected to the brake pedal, and a control valve controlled by the input member to control communication and cut-off between the variable-pressure chamber and one of the constant-pressure chamber and an outside of the housing, wherein the idle stroke position is set by arrangement of the control valve and a constant-pressure valve seat on and from which the control valve seats and unseats.

11. A brake apparatus comprising:
a hydraulic pressure generating device supplying a hydraulic fluid to a wheel cylinder provided in association with a wheel when a brake pedal is operated by at least a predetermined brake pedal operation quantity;
a pump mechanism sucking and supplying the hydraulic fluid from the hydraulic pressure generating device to the wheel cylinder; and
a control unit controlling supply of the hydraulic fluid to the wheel cylinder by the pump mechanism, the control unit being connected to a regenerative brake device applying a regenerative braking force to the wheel by generating electric power from rotation of the wheel;
wherein the control unit has already caused the pump mechanism to supply the hydraulic fluid to the wheel cylinder when the brake pedal is operated in excess of a maximum regenerative braking pedal operation quantity at which the regenerative brake device generates a maximum regenerative braking force; and
wherein, in the hydraulic pressure generating device, the predetermined brake pedal operation quantity is set as a quantity larger than the maximum regenerative braking pedal operation quantity.

12. The brake apparatus of claim 11, wherein the hydraulic pressure generating device transmits a reaction force from a hydraulic pressure generated therein to the brake pedal after the brake pedal is operated in excess of the maximum regenerative braking pedal operation quantity.

13. The brake apparatus of claim 11, wherein the hydraulic pressure generating device has a master cylinder and a booster; and
the predetermined brake pedal operation quantity, at which the hydraulic pressure generating device supplies the hydraulic fluid to the wheel cylinder, being set by an idle stroke quantity in the master cylinder.

14. The brake apparatus of claim 13, wherein the booster has an input member connected to the brake pedal, the input member being arranged such that a reaction force from a hydraulic pressure generated in the master cylinder is transmitted to the input member after the brake pedal is operated by the predetermined brake pedal operation quantity.

15. The brake apparatus of claim 11, wherein the hydraulic pressure generating device has a master cylinder and a booster; and
   the predetermined brake pedal operation quantity, at which the hydraulic pressure generating device supplies the hydraulic fluid to the wheel cylinder, being set by an idle stroke quantity in the booster.

16. The brake apparatus of claim 15, wherein the booster has an input member connected to the brake pedal, the input member being arranged such that a reaction force from a hydraulic pressure generated in the master cylinder is transmitted to the input member after the brake pedal is operated by the predetermined brake pedal operation quantity.

17. The brake apparatus of claim 15, wherein the booster has a housing divided into a constant-pressure chamber and a variable-pressure chamber, an input member connected to the brake pedal, and a control valve controlled by the input member to control communication and cut-off between the variable-pressure chamber and one of the constant-pressure chamber and an outside of the housing, wherein the idle stroke quantity is set by arrangement of the control valve and a constant-pressure valve seat on and from which the control valve seats and unseats.

18. A brake apparatus comprising:
   a master cylinder supplying a hydraulic fluid to a wheel cylinder provided in association with a wheel;
   a booster moving a piston in the master cylinder in response to an operation of a brake pedal;
   a hydraulic pressure control device sucking and supplying the hydraulic fluid from the master cylinder to the wheel cylinder; and
   a control unit controlling supply of the hydraulic fluid to the wheel cylinder by the hydraulic pressure control device, the control unit being connected to a regenerative brake device applying a regenerative braking force to the wheel by generating electric power from rotation of the wheel,
   wherein the booster has a housing divided into a constant-pressure chamber and a variable-pressure chamber, an input member connected to the brake pedal, and a control valve controlled by the input member to control communication and cut-off between the variable-pressure chamber and one of the constant-pressure chamber and an outside of the housing,
   wherein an idle stroke position where the piston in the master cylinder is moved is set, by arrangement of the control valve and a constant-pressure valve seat on and from which the control valve seats and unseats, to a position where the brake pedal is operated in excess of a maximum regenerative braking pedal operation quantity at which the regenerative brake device generates a maximum regenerative braking force.

19. The brake apparatus of claim 18, wherein the hydraulic pressure control device starts to supply the hydraulic fluid to the wheel cylinder when the brake pedal is depressed to the maximum regenerative braking pedal depressed position.

20. The brake apparatus of claim 18, wherein the hydraulic pressure control device starts to supply the hydraulic fluid to the wheel cylinder before the brake pedal is depressed to the maximum regenerative braking pedal depressed position.

* * * * *